United States Patent
Gaid et al.

(10) Patent No.: US 11,787,712 B2
(45) Date of Patent: Oct. 17, 2023

(54) WATER TREATMENT PLANT HAVING INTEGRATED BALLASTED FLOCCULATION AND DECANTATION, AND A CORRESPONDING METHOD

(71) Applicant: Veolia Water Solutions & Technologies Support, Saint-Maurice (FR)

(72) Inventors: Abdelkader Gaid, Paris (FR); Hervé Paillard, Vernon (FR); Philippe Sauvignet, Saint Etienne en Cogles (FR)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 411 days.

(21) Appl. No.: 16/628,835

(22) PCT Filed: Jun. 25, 2018

(86) PCT No.: PCT/EP2018/066988
§ 371 (c)(1),
(2) Date: Jan. 6, 2020

(87) PCT Pub. No.: WO2019/007745
PCT Pub. Date: Jan. 10, 2019

(65) Prior Publication Data
US 2020/0131059 A1  Apr. 30, 2020

(30) Foreign Application Priority Data
Jul. 6, 2017  (FR) ....................... 1756399

(51) Int. Cl.
*C02F 1/52* (2023.01)
*B01D 21/00* (2006.01)
(Continued)

(52) U.S. Cl.
CPC ........ *C02F 1/5209* (2013.01); *B01D 21/0042* (2013.01); *B01D 21/01* (2013.01);
(Continued)

(58) Field of Classification Search
CPC ................ C02F 1/5209; C02F 2305/12; C02F 2209/40; C02F 1/5227; C02F 1/5245;
(Continued)

(56) References Cited

U.S. PATENT DOCUMENTS 1,430,362 A * 9/1922 Devereux ................. C22B 3/02
                                                    210/194
4,259,185 A * 3/1981 Mixon .............. B01F 15/00525
                                                    210/195.3
(Continued)

FOREIGN PATENT DOCUMENTS

CN      102659227 A    5/2012
FR      2726704        2/1988
(Continued)

OTHER PUBLICATIONS

Tubedek, Tubedek Lamella Clarifiers, accessed Sep. 21, 2021 (Year: 2021).*
(Continued)

*Primary Examiner* — Bradley R Spies
*Assistant Examiner* — Jeannie McDermott
(74) *Attorney, Agent, or Firm* — COATS & BENNETT, PLLC

(57) ABSTRACT

The invention relates to a water treatment plant comprising: means for supplying water for treatment, wherein said water has been coagulated previously, a flocculation-decantation device having means for dispensing at least one flocculant reagent, means for dispensing at least one ballast, means for extracting decantation sludge, means for discharging the treated water, means for separating said ballast contained in
(Continued)

Figure 1:
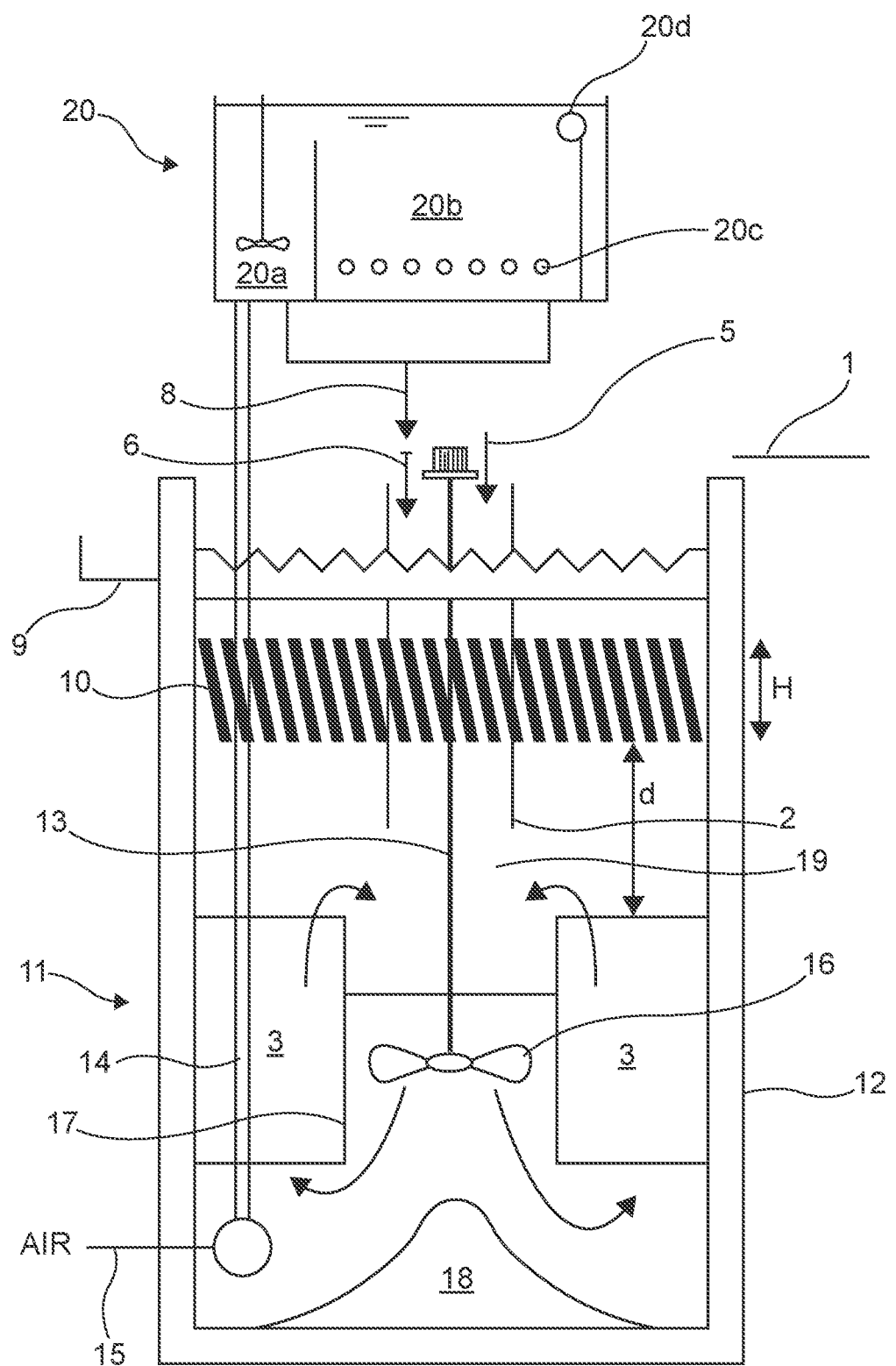

the ballasted sludge, and means for recycling the ballast that has been cleaned in this manner back into the flocculation-decantation device, characterised in that: said flocculation-decantation device has a single tank in the lower portion of which a stirring mechanism is arranged; wherein said single tank comprises slats in its upper portion; and said slats are separated from the stirring mechanism by a distance "d" which is between approximately 0.5 metres and approximately 3 metres. The invention also relates to a method using said plant.

19 Claims, 2 Drawing Sheets

(51) Int. Cl.
  *B01D 21/01* (2006.01)
  *B01D 21/08* (2006.01)
  *B01D 21/24* (2006.01)

(52) U.S. Cl.
  CPC ............ *B01D 21/08* (2013.01); *B01D 21/245* (2013.01); *B01D 21/2488* (2013.01); *C02F 2305/12* (2013.01)

(58) Field of Classification Search
  CPC ....... C02F 1/56; B01D 21/0042; B01D 21/01; B01D 21/08; B01D 21/245; B01D 21/2488; B01D 21/0039
  See application file for complete search history.

(56) References Cited

U.S. PATENT DOCUMENTS

| | | | |
|---|---|---|---|
| 4,927,543 A | 5/1990 | Bablon et al. | |
| 5,800,717 A | 9/1998 | Ramsay et al. | |
| 6,824,692 B2 | 11/2004 | Binot et al. | |
| 2002/0158025 A1 | 10/2002 | Streat | |
| 2007/0114184 A1* | 5/2007 | Essemiani | B01D 21/08 210/738 |
| 2008/0210613 A1* | 9/2008 | Wechsler | C02F 1/24 210/170.05 |
| 2010/0096335 A1* | 4/2010 | Sauvignet | C02F 1/5209 210/709 |
| 2013/0020254 A1* | 1/2013 | Woodard | C02F 3/1284 210/601 |
| 2014/0158614 A1* | 6/2014 | Wang | F17D 1/00 210/605 |
| 2015/0001161 A1* | 1/2015 | Wiemers | B01D 17/047 210/739 |
| 2015/0048030 A1* | 2/2015 | Barbier | B01D 21/0042 210/521 |
| 2016/0145126 A1 | 5/2016 | Ballard et al. | |
| 2017/0072373 A1* | 3/2017 | Wright | B01F 25/42 |

FOREIGN PATENT DOCUMENTS

| | | |
|---|---|---|
| GB | 1398603 | 6/1975 |
| JP | 2005144350 A | 6/2005 |
| JP | 2011140003 A | 7/2011 |
| KR | 101635527 B1 | 7/2016 |
| WO | 9814258 | 4/1998 |
| WO | 9832702 | 7/1998 |
| WO | 0140121 A1 | 6/2001 |
| WO | 2006097650 A1 | 9/2006 |
| WO | 2012107704 A1 | 8/2012 |

OTHER PUBLICATIONS

WO98/032702 English Translation of Applicant provided reference (Year: 1998).*

* cited by examiner

WATER TREATMENT PLANT HAVING INTEGRATED BALLASTED FLOCCULATION AND DECANTATION, AND A CORRESPONDING METHOD

FIELD OF THE INVENTION

The invention relates to the field of physical-chemical treatment of water.

More precisely, the invention relates to a technique aiming to treat contaminated water, such as water to be treated for drinking, municipal and industrial waste water, rainwater or seawater, reducing the content in suspended matter of such water, as well as where applicable the turbidity, concentration in algae, and content in organic matter as well as the colour thereof.

The invention in particular has application in the framework of treating water in order to make it drinkable, but also in the framework of treating municipal or industrial waste water in order to purify it.

PRIOR ART

Among the techniques for the physical-chemical treatment of water known to those skilled in the art, those implementing a step of coagulation, a step of flocculation and a step of decantation of the floc are very widely used.

In order to increase the performance of these techniques, the step of flocculation is assisted by the adding of a ballasting material. In practice, the decantation with ballasted floc consists in adding a ballast, for example microsand, during the step of flocculation in order to increase the density of the floc and to accelerate the decantation speed. The ballast is in general recycled after is it separated from the decantation sludge.

It is also known through patent FR2627704B1 a method for treating water that comprises a step of coagulation, a step of ballasted flocculation and a step of separating floc by decantation. This technique includes a recycling of the ballast carried out by hydrocycloning of the sludge.

Such a method makes it possible to lower the organic matter contained in the water, but it requires providing a coagulation reactor, a flocculation reactor and a decanter. The floor space of the corresponding installations is therefore high although these installations are often required to be in the vicinity of the effluents, not far or in an urban environment where the space available for this type of installation is limited and expensive.

Consequently, there is a real need to reduce the floor space of these water treatment installations.

Moreover, in the installations of the type described in FR26770461, it is necessary to continuously scrape the decanted sludge and, in certain cases, to push it into a hopper in order to extract it. The use of scrapers, and where applicable hoppers, complicates the carrying out of these installations and increases the cost thereof.

Another disadvantage of the installations of prior art resides in the fact that the hydrocyclones implemented for recycling the ballast consume a substantial amount of energy. In addition, their effectiveness decreases with the diameter of the particles to be separated, which can induce losses of ballast that can be substantial. There is therefore a real need to improve the performance of recycling of the ballast in this type of method.

OBJECTIVES OF THE INVENTION

The invention has for objective to propose an installation for the treatment of water by flocculation and decantation with ballasted floc that overcomes at least some of the disadvantages of prior art mentioned hereinabove.

In particular, an objective of this invention is to propose such an installation that can have a floor space that is less than the installations of prior art, with equivalent treatment capacities.

Yet another objective of this invention is to provide such an installation of which the use thereof entails an improvement in the liquid-solid separation performance.

Yet another objective of this invention is to proposer such an installation that can adapt to different treatment flow rates and/or different qualities of water to be treated.

Yet another objective of this invention is to describe such an installation that makes it possible to combat the leakage of ballast during the recycling of the latter.

Yet another objective of this invention is to propose a method that implements such a water treatment installation.

DISCLOSURE OF THE INVENTION

All or a portion of these objectives is achieved thanks to the invention that relates to an installation for the treatment of water comprising:

means for carrying water to be treated coagulated beforehand, a flocculation-decantation device provided with means for distributing at least one flocculant reagent, means for distributing at least one ballast, means for extracting decantation sludge, means for removing treated water, means for separating of said ballast contained in the ballasted sludge, and means for recycling of said ballast cleaned as such to said flocculation-decantation device, characterised in that:

said flocculation-decantation device comprises a single tank in the lower portion of which a stirrer is arranged;

said single tank is provided in its upper portion with lamellae;

said lamellae are separated from said stirrer by a distance "d" between about 0.5 metres and about 3 metres.

The water to be treated is water coagulated beforehand either by injection of coagulant into the water supply line, or in the reactor provided upstream of the installation.

During the implementation of such an installation, the flocculation and the decantation of the water are integrated in that they are carried out in the same compartment, namely the single tank that receives the stirrer.

With respect to installations of prior art, wherein the flocculation is carried out in a tank and the decantation in another, the floor space of the installation according to the invention is therefore smaller. The flocculation-decantation device according to the invention as such makes it possible to group together during the implementation thereof the step of ballasted flocculation and the step of decantation, and as such substantially reduce the size of the installation required for this implementation.

During the use of such an installation, the flocculation occurs in the lower portion of the tank provided with the stirrer. In this portion, the stirrer places in intimate contact the ballast, the polymer and the coagulated water, which leads to the formation of aggregates (floc) weighed down by the ballast.

The separation between this flow and the water occurs in the zone between the blades of the stirrer and the lamellae. The distance "d" that separates these two elements, according to the invention between about 0.5 metres and about 3 metres, is designed to create during the implementation of the installation, a zone in which the water is not or is very little stirred by the stirrer. This tranquil zone is propitious to the separation of solid matter, formed by the ballast and the sludge, from the rest of the water. The distance "d" is here understood as the distance between the horizontal plan that receives the lower edge of the lamellae and the horizontal plane that receives the upper portion of the stirrer (outside the vertical shaft and motor).

Still according to the invention the tank is provided in its upper portion with lamellae mounted parallel between them, fixed or rotating. Preferably, these lamellae are inclined by an angle formed by the lamellae and the horizontal plane between 15° and 60°. These lamellae make it possible to create a physical barrier with regards to fine particles that have not flocculated and to generate a loss of load providing an equitable distribution between the openings of the lamellar pack. Preferably, these lamellae are organised into a lamellar pack of which the height H is between 0.3 metres and 1.4 metres.

Note that the installation according to the invention does not require a sludge scraper in the lower portion of the tank.

In practice, the ballast is chosen from sand, micro-sand, garnet, ilmenite, and any other granular material that has an actual density greater than 2.3 tonnes/m$^3$. The adding of such a ballast as such makes it possible to increase the density of the floc and to accelerate the decantation speed thereof. The term "ballasted sludge" means the decantation sludge mixed with the ballast.

According to an alternative of the installation of the invention, said means for separating said ballast contained in said ballasted sludge include a pump and a device for separating, said pump being able to carry said ballasted sludge inside said device for separating.

According to another alternative, these means include means for injecting air into said ballasted sludge and a device for separating.

Such means for injecting air form an air lift by the injection of air bubbles into a vertical line for removing ballasted sludge. Such an air lift makes it possible to favour the driving of the ballast thanks to the bubbles and to clean the ballast thanks to the movements created by the bubbles generating an abrasion of the agglomerate formed around the latter which makes it possible to separate the ballast from the sludge.

Preferably, said device for separating sludge and ballast comprises a blade mixer or similar member rotating at high speed associated with a decanter of small size. The high-speed mixer allows for the dissociation of the ballast from the rest of the sludge which may have already begun during the transport of the ballasted sludge to the device for separating via the air lift. The small-size decanter makes it possible to collect the ballast in its lower portion and the floating sludge in its upper portion. The floating of the sludge can be improved by providing an injection of fluid such as air. This sludge, separated from the ballast, is extracted to a specific treatment.

The stirrer that is provided in the single tank can be constituted in different forms. As such, it advantageously comprises blades rotatably mounted on a vertical axis. According to a particularly interesting embodiment, said stirrer in addition comprises a cylindrical flow guide arranged around said blades.

As such, when such a stirrer is implemented, the water circulating inside the flow guide tube from top to bottom, and outside the latter from bottom to top. This makes it possible to optimise the mixture of water with the flocculant and the ballast.

According to another interesting alternative of the invention, said stirrer in addition comprises a static obstacle placed at the bottom of the tank globally centred about said axis in the extension of the stirrer, said static obstacle having an outer surface that has, in a plane passing through the axis, an outer transverse dimension that increases when moving away from the blades parallel to said axis, with a slope with respect to this axis which is constant or increasing. The mixture is driven along this axis to the static obstacle which imposes trajectories of a general U-shape which allows the water to rise to the tranquil zone. The static obstacle also allows the ballasted floc that settles to be deposited in the angles.

The invention also relates to a method for treating water that implements the installation described hereinabove, said method comprises a step of coagulation, a step of ballasted flocculation, a step of decanting and a step of separating and of recycling ballast to said step of ballasted flocculation, and being characterised in that said step of ballasted flocculation and said step of decanting are carried out in said single tank.

Preferably, the method comprises the steps according to which:
- a flocculant and a ballast are added to the water coagulated beforehand in the single tank;
- the coagulated water, the ballast and the flocculant are mixed in the lower portion of the single tank provided with the stirrer;
- a tranquil non-stirred zone is arranged in the upper portion of the single tank, between the stirrer and the lamellar pack, zone propitious to the decantation of the floc formed;
- the treated water is removed by the means of removing treated water provided in the upper portion of said tank after having transited through said lamellae;
- the sludge is removed by said means for removing ballasted sludge; and,
- air is injected into said sludge in such a way as to extract therefrom the ballast that it contains and to clean it without hydrocycloning;
- the cleaned ballast is recycled to the single tank and the sludge is extracted.

The method, according to the invention does not therefore implement a step of hydrocycloning. This makes it possible to reduce the energy consumption required for the separation and to reduce the leakage of material in terms of ballast.

Preferably, the residence time of the water inside said inner tank is between 2 minutes and 30 minutes. This residence time will depend on the nature of the water to be treated but also on the nature of the ballast used.

LIST OF FIGURES

Figure 2:
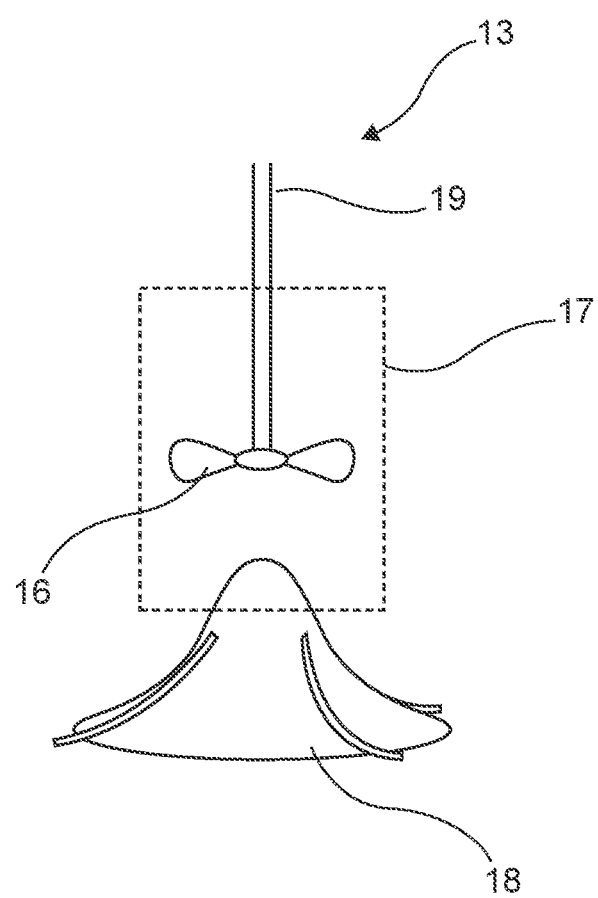

Other characteristics and advantages of the invention shall appear more clearly when reading the following description of a preferred embodiment, provided solely as a simple and non-limiting illustration, and of the accompanying drawings, among which:

FIG. 1 diagrammatically shows an embodiment of an installation according to the invention; and FIG. 2 is a drawing of the stirrer of the installation according to FIG. 1.

DESCRIPTION OF AN EMBODIMENT OF THE INVENTION

In reference to FIG. 1, the installation according to the invention comprises means for carrying 1 water to be treated that has been coagulated beforehand via the adding of a coagulant reagent. The coagulation of the water can be carried out in a coagulation reactor provided with means for distributing a coagulant reagent as well as a means for stirring comprised of a blade stirrer rotatably mounted about a vertical axis. This coagulation can also be carried out in line by injecting a coagulant reagent into a supply line of raw water to be treated.

In practice, the coagulant reagent can be organic or mineral. It will be advantageously chosen from aluminium sulphate, sodium aluminate, ferric chloride, ferric sulphate, ferrous sulphate, polyamines (epichlorhydrin or Polydadmac®), melamine-formol resins, polyethylenimines as well as certain cationised plant polymers.

The installation moreover comprises a flocculation-decantation device 11 comprising a single tank 12 provided with a stirrer 13. This tank 12 is provided in its central portion with a tube 2 that collects the coagulated water supplied by the means 1 in order to carry it in the lower portion of the tank 2 above the stirrer 13.

This stirrer 13 comprises blades 16 rotatably mounted about a vertical axis 19. Also in reference to FIG. 2, the stirrer 13 also comprises a cylindrical flow guide 17 formed from a section of tube, and a static obstacle 18 centred around the axis 19. This obstacle 18 has a roughly pyramidal shape. The flow guide tube is maintained in place around the blades thanks to four vertical partitions 3, of which two can be seen in FIG. 1, fixing it to the side walls of the tank 12 and used to improve the hydraulic flow.

The installation in addition comprises means for distributing 5 a flocculant reagent in the tube 2 of the tank 12. As an example, the flocculant reagent can be chosen from water-soluble polymers of plant or animal origin, and water-soluble polyelectrolytes with a high molecular weight and different ionicities.

The installation in addition comprises means for distributing 6 a ballast in the tube 2 of the tank 12. According to the invention, this ballast is comprised of a powder or grain material that has an actual density greater than 2.3 tonnes per cubic metre. This is preferably sand, garnet powder or ilmenite powder.

The upper portion of the tank 12 is moreover provided with a lamellar pack comprised of inclined lamellae 10. This lamellar pack can advantageously have a height H between 0.3 m and 1.4 m. The lower portion of this pack is provided with a distance "d" from the stirrer that can vary in practice, according to the embodiments, between 0.5 m and 3 m. This distance "d" is that between the horizontal plane receiving the upper portion of the stirrer (outside the axis 19), here the upper portion of the cylindrical flow guide 17, and the horizontal plane receiving the lower end of the lamellae of the lamellar pack 10.

Means for removing 9 treated water including a chute are provided on the upper portion of the tank 12.

The installation moreover comprises a vertical line for removing 14 sludge, said line 14 being provided inside the tank 12.

The installation also comprises means for separating of said ballast contained in said ballasted sludge followed by means of recycling 8 of said ballast cleaned as such to said flocculation-decantation device.

By way of example, said means for separating include means for injecting 15 air in the form of bubbles into the line 14, allowing for the formation of an air lift, and a device for separating 20 the ballast contained in the sludge carried by this air lift. The device for separating, into which the pipe 14 arrives, is provided with a blade mixer 20a rotating at a high followed speed followed by a small-size decanter 20b provided with an air injection bar 20c and with a chute for removing 20d floated sludge.

Using an air lift makes it possible not only to carry the sludge to the device for separating but also to prime the separation of the ballast that it contains and as such to reduce the loss of the ballast caused by the separation.

According to the invention, the means for separating do not include a hydrocyclone.

The operation of such an installation shall now be described.

The coagulated water is carried by the means 1 into the tank 12 in the lower portion of the latter by transiting through the tube 2. Flocculant and ballast are carried via the tube 2 in the lower portion of the tank 12 respectively by the means 5 and 6. In this lower portion, the rotating movement of the blades 16 makes it possible to intimately mix the coagulated water, the ballast and the flocculant. This mixture and the flocculation are optimised thanks to the cylindrical flow guide 17 and to the static obstacle 18. This mixture undergoes a movement inside the flow guide 17 from top to bottom then outside the flow guide 17 from bottom to top as indicated by the arrows in FIG. 1.

The speed of the blades 16 of the stirrer 13 is designed in such a way that, between the stirrer and the lamellar pack, the mixture of water, ballast and polymer exhibits a tranquil zone propitious for the decantation of the floc to the bottom of the tank. The decantation of this floc is accelerated thanks to the presence of the ballast that it contains.

The water separated from the floc then transits in the lamellar pack 10 which makes it possible to retain the fine particles that it contains that did not flocculate. The treated water is then removed by the means 9 comprising a chute, in the upper portion of the tank 12.

The sludge is extracted from the tank 12 by the line 14 at the foot of which air is supplied by the means 15. The air lift created drives the bubbles to the device for separating 20 and makes it possible to prime the separation of the ballast from the rest of the sludge. This separation is completed in the device 20. The cleaned ballast is reintroduced by the line 8 into the tank 12 of the device 11 and the sludge is extracted by the chute 20d to a specific treatment.

The term "configured" means "designed to".

The invention claimed is:

1. A method of treating coagulated water containing solid matter in a single flocculation-decantation tank having a mixer in a bottom portion thereof, comprising:
   directing the coagulated water into the flocculation-decantation tank;
   directing a flocculant into the flocculation-decantation tank;
   directing a ballast into the flocculation-decantation tank, wherein the ballast is fed directly into the single flocculation-decantation tank;
   separating the solid matter from the water via a ballasted flocculation process by mixing with the mixer, the flocculant, the ballast and the coagulated water in the bottom portion of the tank to form ballasted floc that accumulates in a bottom portion of the flocculation-decantation tank as ballasted sludge;
   the flocculation-decantation tank including lamellae disposed in a top portion of the tank above the mixer;
   creating a non-stirred tranquil zone horizontally formed in the flocculation-decantation tank below the lamellae such that the tranquil zone extends horizontally across the flocculation-decantation tank between the mixer and the lamellae;

removing the ballasted sludge from the bottom portion of the flocculation-decantation tank by directing the ballasted sludge into a discharge line, injecting air into the discharge line and transferring the ballasted sludge via an air lift from the bottom portion of the tank to a ballasted sludge separator including a blade mixer;

in the ballasted sludge separator, subjecting the ballasted sludge to the blade mixer and disassociating the ballast from the ballasted sludge to yield separated ballast and separated sludge;

collecting the separated ballast in a decanter disposed over the tank and decanting the separated sludge from the decanter;

recycling the separated ballast back to the flocculation-decantation tank; and decanting a treated water from the flocculation-decantation tank such that both flocculation and decantation occurs in the same tank; and wherein the ballasted flocculation process and the decanting of treated water takes place simultaneously in the single flocculation-decantation tank.

2. The method of claim 1 wherein the mixer includes a blade stirrer and a flow guide tube surrounding the blade stirrer, and where the method includes maintaining the lamellae approximately 0.5 meters to approximately 3 meters above the mixer.

3. The method of claim 1 wherein removing the ballasted sludge from the tank includes inducing the ballasted sludge into the sludge discharge line and driving the ballasted sludge with air through the discharge line and cleaning the ballasted sludge in the process due to air bubbles abrading the ballasted sludge as the ballasted sludge moves through the discharge line which in turn facilitates the separation of the ballast from the sludge.

4. The method of claim 1 wherein there is a flow guide tube disposed in the bottom portion of the tank and the method includes circulating the mixture of ballast, flocculant and water from the bottom portion of the tank upwardly through the flow guide and then back down to the bottom portion of the tank.

5. The method of claim 4 further including directing the mixture of ballast, flocculant and water downwardly from the mixer and causing the mixture to impact against a static obstacle disposed in the bottom portion of the tank.

6. The method of claim 1 wherein the flocculation and decantation tank includes a vertical elongated tube that extends from a top portion of the tank through at least a portion of the tranquil zone and which includes an outlet end disposed above the mixer; and wherein the method includes injecting the flocculant and the ballast into an upper open end of the elongated tube.

7. The method of claim 1 wherein the ballasted sludge separator is disposed above the flocculation-decantation tank.

8. The method of claim 1 wherein the water in the flocculation-decantation tank is flocculated and decanted at the same time.

9. A ballasted water treatment system configured to treat water containing solid matter, comprising:
a single flocculation and decantation tank configured to simultaneously flocculate water and decant treated water from the tank;
a ballasted supply line configured to direct a ballast directly into the tank;
a flocculant line configured to supply a flocculant to the water in the tank;
a mixer disposed in a bottom portion of the tank and configured to mix the ballast, the flocculant and the water to form a mixture and to produce a ballasted floc which at least partially forms ballasted sludge in the lower portion of the tank;
the mixer including a rotary-driven blade for mixing the ballast, the flocculant and the water and a flow guide disposed outwardly from the blade and configured to circulate the mixture through the bottom portion of the tank;
lamellae disposed across an upper portion of the tank and spaced above the mixer;
a non-stirred tranquil zone horizontally formed below the lamellae such that the tranquil zone extends horizontally across the flocculation and decantation tank between the lamellae and the mixer;
wherein the distance between the lamellae and the mixer is 0.5 to 3 meters;
a ballasted sludge discharge line configured to receive the ballasted sludge and to direct the ballasted sludge from the tank;
an air supply line operatively connected to the ballasted sludge discharge line and configured to inject air into the ballasted sludge discharge line and wherein the ballasted discharge line comprises an air lift that is configured to drive the ballasted sludge through the ballasted sludge discharge line to a ballasted sludge separator located above the tank;
the ballasted sludge separator operatively connected to the ballasted sludge discharge line for separating the ballast from the ballasted sludge;
said ballasted separator comprises a blade configured to engage the ballasted sludge and configured to disassociate the ballast from the ballasted sludge to yield separated ballast and sludge;
said ballasted sludge separator further includes a sludge decanter disposed above the tank and configured to collect and decant sludge yielded by the ballasted sludge separator; and
a ballast recycle line operatively connected to the ballasted sludge separator and configured to recycle separated ballast back to the tank.

10. The ballasted water treatment system of claim 9 wherein the mixer comprises blades mounted on a vertical axis and wherein the flow guide comprises a concentric cylindrical flow tube arranged around said blades.

11. The ballasted water treatment system of claim 9 characterized in that said mixer further comprises a static obstacle globally centered about an axis, said static obstacle having an outer surface that has, in a plane passing through the axis, an outer transverse dimension that increases when moving away from the blades parallel to the axis, with a slope with respect to the axis which is constant or increasing.

12. The ballasted water treatment system of claim 9 wherein said lamellae are organized into a lamellae pack which has a height H between 0.3 meters and 1.4 meters.

13. A method of treating coagulated water in a single flocculation and decantation tank where flocculation and decanting of treated water occurs simultaneously in the single tank, the method comprising:
a step of ballasted flocculation that takes place in the single tank;
a step of decanting a treated water that takes place in the single tank;
wherein said step of ballasted flocculation and said step of decanting treated water are carried out simultaneously in the single flocculation and decantation tank; wherein the method further comprises:

(i) as a part of the step of ballasted flocculation, adding a flocculant and a ballast directly into the water in the single tank;
(ii) mixing the water, the ballast and the flocculant in a lower portion of the single tank which is provided with a stirrer, and wherein the mixing of the water, ballast and flocculant results in the formation of ballasted floc which accumulates in the lower portion of the flocculation and decantation tank as ballasted sludge;
(iii) forming a tranquil non-stirred zone in the single tank between the stirrer and a lamellae pack, wherein the tranquil non-stir zone extends horizontally across the single flocculation and decantation tank below the lamellae pack, and wherein the tranquil non-stir zone facilitates decanting the treated water from the single tank while ballasted flocculation occurs in the single tank;
(iv) wherein decanting the treated water comprises removing the treated water in the upper portion of the single tank after the treated water has passed through the lamellar pack;
(v) removing the ballasted sludge from the tank by directing the ballasted sludge into a discharge line;
(vi) injecting air into the discharge line;
(vii) employing the injected air to drive the ballasted sludge through the discharge line to a ballast separator disposed over the tank and including a decanter for collecting separated sludge;
(viii) separating the ballast from the ballasted sludge in the ballast separator without hydrocycloning the ballasted sludge; and
(ix) recycling the separated ballast to the single tank and decanting sludge separated from the ballasted sludge from the sludge decanter;
wherein the ballast separator includes a rotatively driven blade and the method includes engaging the ballasted sludge with the rotatively driven blade and disassociating the ballast from the ballasted sludge which effectively results in the separation of the ballasted sludge into separated ballast and the separated sludge.

14. The method of claim 13 including maintain the lamellae approximately 0.5-3 meters above a mixer disposed in a bottom portion of the tank.

15. The method of claim 13 wherein the tank is provided with a stirrer and a flow guide tube in the bottom portion thereof and the method includes circulating the mixture of ballast, flocculant and water from the bottom portion of the tank upwardly through the flow guide tube and then back down to the bottom portion of the tank.

16. The method of claim 13 wherein the flocculation and decantation tank includes a vertical elongated tube that extends from a top portion of the tank through at least a portion of the tranquil zone and which includes a terminal end disposed above the stirrer; and wherein the method includes injecting the flocculant and the ballast into the upper open end of the elongated tube.

17. The method of claim 1 wherein the residence time of the water inside the single flocculation and decantation tank is maintained between 2 minutes and 30 minutes.

18. The method of claim 13 wherein the residence time of the water inside the single flocculation and decantation tank is maintained between 2 minutes and 30 minutes.

19. The method of claim 1 including directing the water into the top portion of the single tank, resulting in the water flowing downwardly through the tank to the bottom portion of the tank where the coagulated water is mixed with the ballast and the flocculant, and thereafter, the water moves upwardly through the tank and through the non-stirred tranquil zone and thereafter moves upwardly through the single tank and through the lamellae and thereafter moves from the lamellae into the upper portion of the tank where the water is decanted from the tank.

* * * * *